Feb. 18, 1958  C. H. HOLSCLAW  2,823,817
TRAILER TILTING ARRANGEMENT
Filed Aug. 12, 1955  2 Sheets-Sheet 1
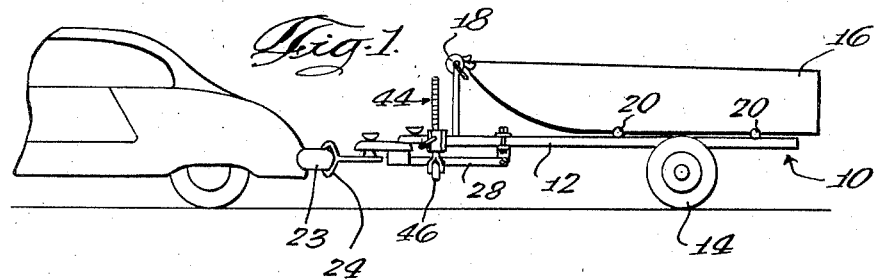
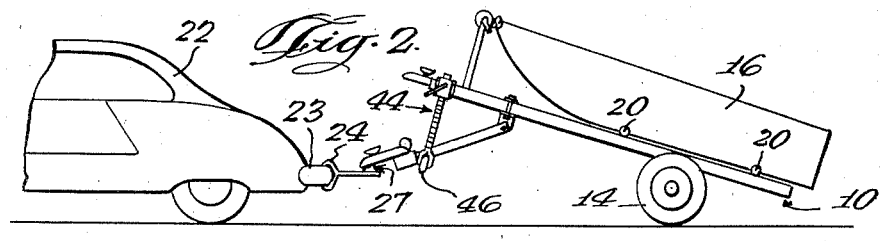
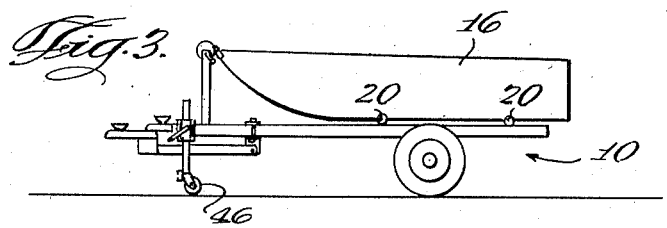
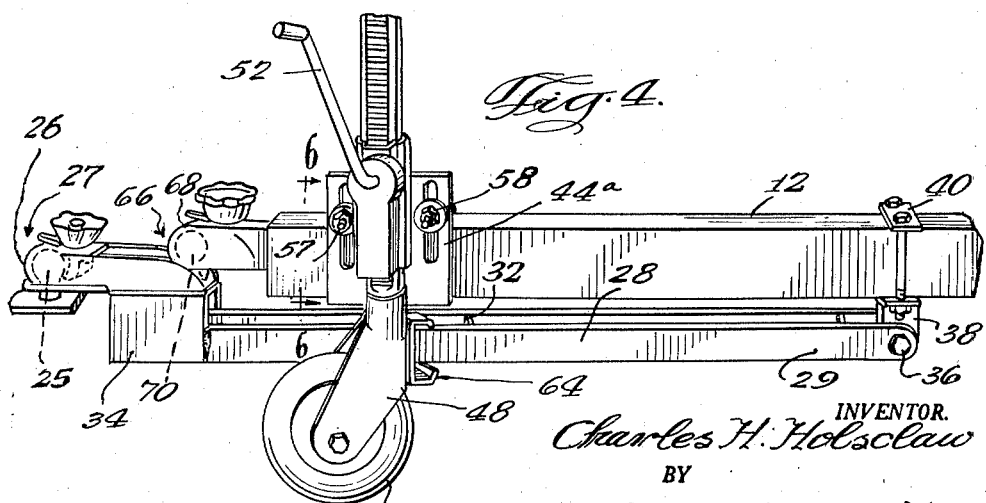
INVENTOR.
Charles H. Holsclaw
BY
Carlson, Pitzner, Hubbard & Wolfe
attorneys

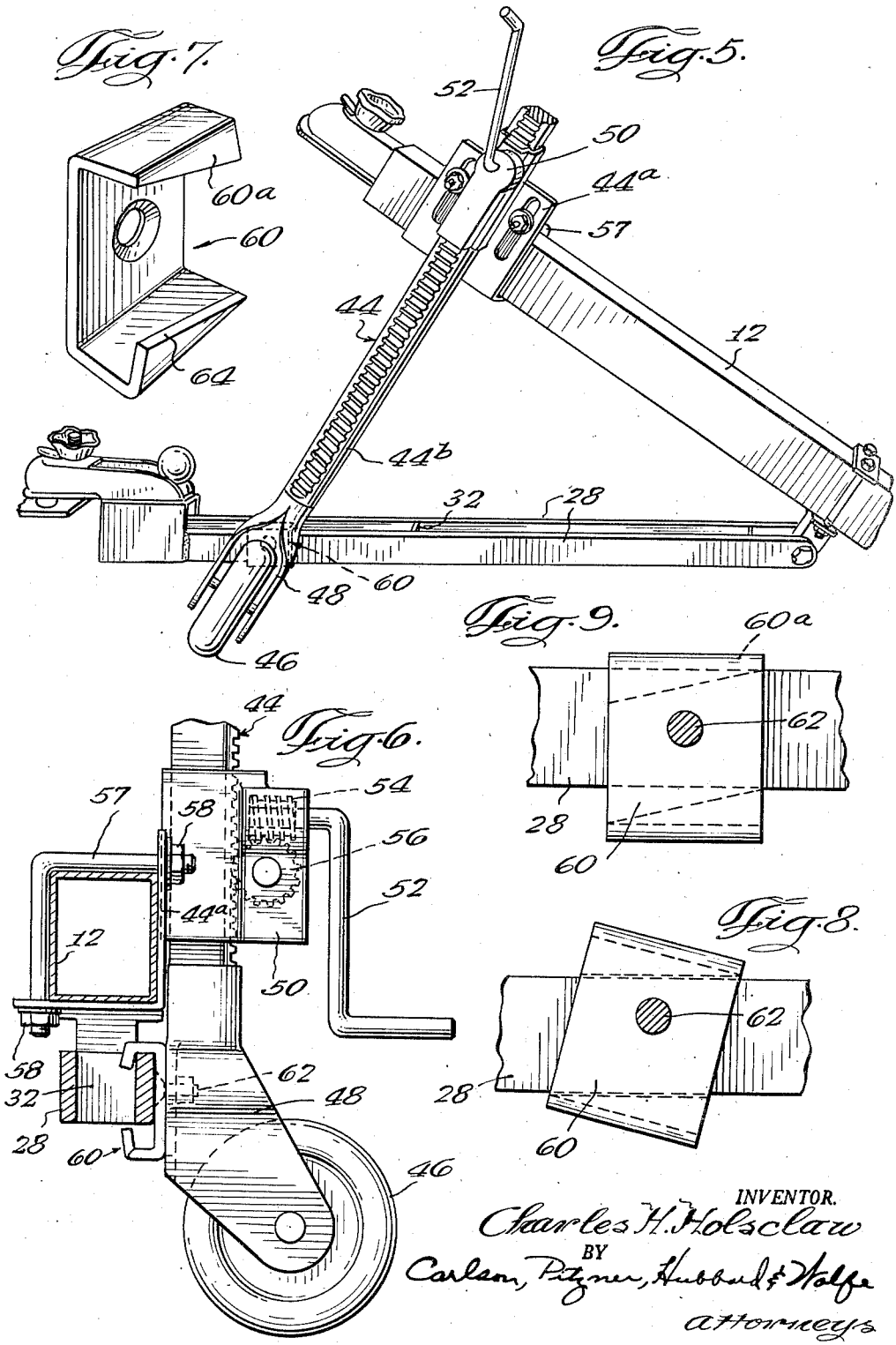

United States Patent Office 2,823,817
Patented Feb. 18, 1958

---

2,823,817

TRAILER TILTING ARRANGEMENT

Charles H. Holsclaw, Evansville, Ind.

Application August 12, 1955, Serial No. 528,015

7 Claims. (Cl. 214—506)

The present invention relates to boat trailers, and more particularly to such a trailer which may be tilted for launching or loading a carried boat.

In conventional trailer tilting arrangements, it is often necessary to exert a considerable amount of manual force in tilting the trailer and then holding it in the tilted position. In the case of large boats, one person must simply hold the trailer in a tilted position while someone else unloads the boat from the trailer.

It is a general object of the present invention to provide a trailer tilting arrangement affording positive means for tilting a trailer to any degree desired and for maintaining the trailer, once tilted, in such position. It is an associated object to provide means for tilting a trailer and yet maintaining the trailer in a hitched condition with respect to a hauling vehicle, such as an automobile.

It is another object of the invention to provide such a tilting arrangement which is effective to tilt the entire trailer and yet may be safely and easily operated in such a manner that a boat can be loaded or unloaded by a single operator. It is an allied object of the invention to provide a trailer tilting arrangement which is adapted for safely tilting relatively large, heavy boats as well as lightweight boats.

It is a further object of the present invention to provide a trailer tilting arrangement in which the means for tilting the trailer may also be employed to normally support the front end of the trailer when the latter is unhitched. A more specific object as regards this aspect of the invention is to provide a boat trailer tilting arrangement including a jack mechanism for normally supporting the trailer, which mechanism may also be employed to jackknife the trailer and thereby tilt it into a boat loading or launching position.

It is a further detailed object of the invention to provide a trailer tilting arrangement including a jack mechanism having novel hook means for locking the mechanism in a trailer tilting condition. An allied object in this respect is to provide self-locking hook means of such type which are novelly maintained in a locked condition by the weight of the carried boat.

Finally, it is an object of the invention to provide a trailer tilting arrangement which is simple, economically manufactured, and requires a minimum of care and maintenance.

Other objects and advantages will become apparent upon reading the attached detailed description, and upon reference to the drawings, in which:

Fig. 1 is an elevation showing a boat trailer in accordance with the present invention hitched to an automobile and carrying a boat thereon.

Fig. 2 is an elevation corresponding to Fig. 1 showing the boat trailer in a jackknifed or tilted position.

Fig. 3 is an elevation of the loaded boat trailer when unhitched from the automobile and supported by the jack mechanism.

Fig. 4 is an enlarged perspective of the front end of the boat trailer showing the various component parts of the trailer tilting arrangement.

Fig. 5 is an enlarged perspective corresponding to Fig. 4 showing the trailer in the tilted or jackknifed position.

Fig. 6 is a sectional elevation taken along the lines 6—6 in Fig. 4.

Fig. 7 is a perspective of the jack mechanism locking member employed in accordance with the invention.

Fig. 8 is an enlarged fragmentary elevation of the locking member in an engaged but unlocked position prior to tilting of the trailer.

Fig. 9 is an enlarged fragmentary elevation of the locking member shown in Fig. 8 in a locked position during tilting of the trailer.

While the invention has been described in connection with a preferred embodiment, it will be understood that it is not intended to limit the invention thereto, but it is intended to cover all modifications and alternative constructions falling within the spirit and scope of the appended claims.

Turning now to the drawings, an illustrative trailer 10 is shown in Figs. 1, 2 and 3. The trailer 10 includes a frame from which extends a central longitudinal tongue 12 having a box shaped cross section and carried by a transverse saddle assembly supported on a pair of road wheels 14.

A typical boat 16 is shown in the carried position on the trailer 10. In this instance, a winch 18 is mounted on the front portion of the trailer for facilitating loading and unloading of the boat from the trailer, and boat supporting roller assemblies 20 are shown associated with the trailer for facilitating movement of the boat onto and off from the trailer.

The hauling vehicle shown in Figs. 1 and 2 is an automobile 22 including on its rear bumper 23 a conventional bumper clamp 24 carrying an upstanding ball 25 capable of being received in the conventional socket 26 of a trailer hitch 27.

In order that the longitudinal tongue 12 may be tilted with respect to the axis of the road wheels 14, an auxiliary tongue or trailer tilt bar 28 is provided at the front portion of the trailer. It will be seen that the auxiliary tongue 28 comprises a pair of laterally spaced parallel flat bars 29 rigidly connected at their ends and separated intermediate the ends by a plurality of transverse spacers 32. At its extreme front end, the tilt bar 28 carries the trailer hitch 27 which is rigidly fastened thereto by means of a box shaped structural member 34.

It will be seen that the tilt bar 28 is normally disposed directly beneath the front end of the longitudinal tongue 12 and is pivoted at its rear end to the latter by means of a transverse pivot 36 which passes through a pivoting bracket 38 held to the longitudinal tongue by means of a clamp 40. In this way a pivoting arrangement is provided whereby the longitudinal tongue 12 and the auxiliary tongue 28 are pivotable with respect to each other about the pivot point 36.

In accordance with the present invention, a trailer tilting arrangement is provided near the extreme front end of the trailer 10 for pivoting the longitudinal tongue 12 with respect to the tilt bar 28 and with respect to the axis of the road wheels 14 so as to jackknife the trailer about the pivot point 36 upwardly at its front end and downwardly (and into the water) at its rear end. In this instance, the trailer tilting arrangement includes a jack mechanism 44 having a frame 44a mounted on the tongue 12 and a vertical support member 44b, the lower end of which has provision for anchoring to the tilt bar 28 for effecting a relative scissor-like motion as between the tongue 12 and the tilt bar (Figs. 2 and 5). The support member 44b is also provided at its lower end with a castered dolly wheel 46 journaled in a wheel housing 48.

With regard to the details of construction of the jack mechanism 44, the upper portion of the vertical support member 44b as shown takes the form of a rack which extends through a crank housing 50 mounted on the frame 44a.

Referring particularly to Fig. 6, means for moving the crank housing 50 up and down along the rack 44b is provided in the form of a crank 52 and associated gears, all mounted within the housing 50. The cranking arrangement employed is of the conventional type wherein a worm gear 54 carried by the inner end of the crank 52 is enmeshed with a bevel gear 56 which in turn engaged the rack teeth. The internal gears are preferably of the irreversible type to provide positive jack locking means. Of course any conventional jack lock may be employed, as for example a pawl and ratchet assembly (not shown). As will be seen, the frame 44a comprises an L-shaped plate adapted to be tightly fastened around the front portion of the longitudinal tongue 12 by means of a pair of L-bolts 57 and associated nuts 58.

For locking the jack mechanism 44 with respect to the tilt bar 28, a locking member 60 of novel construction is attached to the lower end of the vertical support member 44b for releasably engaging the tilt bar. Referring particularly to Figs. 4, 6 and 7 through 9, it will be seen that the member 60 in the present instance is of generally C-shape and is pivotally mounted on the housing 48 by means of a central flat head screw 62. The upper portion 60a of the C-shaped locking member defines a hook which latches over the tilt bar 28 so that the support member 44b may be locked in seated position on the tilt bar. Preferably, the locking member 60 is mounted on the back side of the housing 48 where it is normally in an out-of-the-way position. Thus, it is seen that the castered wheel housing 48 may be simply rotated, 90° as shown in Figs. 4 and 5, from a normal road engaging position to bring the locking member 60 into engagement with the tilt bar 28.

To prevent accidental dislodging of the vertical support member 44b from the tilt bar 28 during tilting of the trailer, the C-shaped locking member 60 has diagonally cut edges 64 (Figs. 7, 8 and 9) which define a parallelogram shaped side opening. From Fig. 8 then it will be observed that engagement of the locking member 60 with the tilt bar 28 is effected by simply rotating the former slightly with respect to the wheel housing 48 until the opening in the member 60 is aligned with the adjacent horizontal tilt flat bar 29, and then slipping the hook 60a over the top edge of the flat bar so that the latter is substantially enclosed within the locking member.

Fig. 9 shows the locked position of the member 60 in which the latter rotates slightly about the pivot 62 when the hook 60a assumes a seated condition on the top edge of the flat bar 29. Thus it is seen that while the hook 60a may be easily slipped over the flat bar 29 by suitable rotative manipulation of the locking member 60, once the hook is seated the flat bar cannot slip out of engagement with the member 60 since there is no way for the flat bar to align itself with the parallelogramic opening in the locking member. Further, the weight of the boat itself when being carried in transport position serves to maintain the hook in a seated condition upon the tilt bar.

For normally maintaining the tongues 12 and 28 in parallel locked relation, the extreme front end of the longitudinal tongue 12 is provided with a trailer tilting hitch 66 which is similar to the trailer hitch 27 above described, including a socket 68 adaptable to normally receive a ball 70 carried on top of the box-like tongue member 34. Thus, when the boat 16 is in the transport position, the trailer is hitched as at 27 to the automobile 22 and the longitudinal tongue 12 is maintained in a horizontal position and in rigid parallel relation to the tilt bar 28 due to engagement of the trailer tilting hitch 66. In this position, the castered wheel 46 is normally disposed in a road engaging direction although the wheel does not actually engage the road, of course.

When it is desired to tilt the trailer, the tilting hitch 66 is manually disengaged, the wheel housing 48 is rotated 90° with respect to the road engaging direction, and the locking member 60 is slightly rotated about the pivot 62 until the parallelogramic opening therein is aligned with the adjacent flat bar 29. The hook 60 is next slipped over the upper edge of the flat bar 29 so that the member 60 substantially encloses the flat bar. Then, upon the operator simply turning the crank 52, the hook 60a immediately seats along the upper edge of the flat bar to lock the vertical support member 44b and the tilt bar 28, and the crank housing 50 moves outwardly along the rack to raise the longitudinal tongue 12 upwardly and away from the tilt bar. Upon attaining the desired degree of trailer tilt, the operator need only release the crank 52 and the jack mechanism 44 positively holds the respective tongues 12 and 28 in a scissor-like condition until the boat 16 has been unloaded from the trailer. This is the position of the trailer shown in Figs. 2 and 5.

To restore the trailer to its normal horizontal position, the operator simply rotates the crank 52 in a reverse direction so as to lower the front end of the longitudinal tongue 12 until the tongue has attained a horizontal position and the socket 68 of the tilting hitch 66 is re-positioned over the associated ball 70. After the trailer tilting hitch 66 is tightened, the locking member 60 may be rotated to align its side opening with the flat bar 29 and the hook 60a may be removed from the tilt bar to thereby unlock the tilt bar and the vertical support member 44b.

One of the features of the present invention is illustrated in Fig. 3 wherein the jack mechanism 44 is employed as a support for the front end of the trailer 10 when the latter is unhitched from the automobile 22. It will be seen that when the locking member 60 is released from the flat bar 29, the vertical support member 44b may be moved up and down independent of the tilt bar 28. In this position and with the dolly wheel 46 resting on the ground, the entire front end of the trailer may be raised or lowered with respect to the ground by cranking the jack mechanism 44 up or down.

I claim as my invention:

1. In a boat trailer the combination comprising a frame having a pair of wheels, a tongue extending forwardly from the frame, a trailer tilt bar arranged so as to be normally parallel to said tongue, said tilt bar having means at its forward end for anchoring to a hauling vehicle and having a pivot connection with said tongue at its rear end, means for clamping the tilt bar in its parallel position relative to the tongue under conditions of transport while permitting disengagement so as to enable the tongue to scissor upwardly about the pivot connection for unloading of the boat, a jack mechanism anchored to the tongue and including a vertical support member together with means for lowering the support member into contact with the ground for supporting the tongue in the absence of the hauling vehicle, and means at the lower end of the vertical support member for engaging the tilt bar for forcibly scissoring the tongue upwardly with respect to the tilt bar when the latter is coupled to the hauling vehicle.

2. In a boat trailer the combination comprising a frame having a pair of wheels, a tongue extending forwardly from the frame, a trailer tilt bar arranged so as to be normally parallel to said tongue, said tilt bar having means at its forward end for anchoring to a hauling vehicle and having a pivot connection with said tongue at its rear end, means for clamping the tilt bar in its parallel position relative to the tongue under conditions of transport while permitting disengagement so as to enable the tongue to scissor upwardly about the pivot connection for unloading of the boat, a jack mechanism anchored to the tongue and including a vertical support member together with means for lowering the support member into contact with the ground for supporting the tongue in the absence of the hauling vehicle, and means including a hook at the lower end of the vertical support member for releasably engaging the tilt bar for forcibly scissoring the tongue upwardly with respect to the tilt bar when the latter is coupled to the hauling vehicle.

3. In a boat trailer the combination comprising a frame having a pair of wheels, a tongue extending forwardly from the frame, a trailer tilt bar arranged so as to be normally parallel to said tongue, said tilt bar having means at its forward end for anchoring to a hauling vehicle and having a pivot connection with said tongue at its rear end, means for clamping the tilt bar in its parallel position relative to the tongue under conditions of transport while permitting disengagement so as to enable the tongue to scissor upwardly about the pivot connection for unloading of the boat, a jack mechanism anchored to the tongue and including a vertical support member together with means for lowering the support member into contact with the ground for supporting the tongue in the absence of the hauling vehicle, and means including a locking member pivotally mounted at the lower end of the vertical support member for engaging the tilt bar for forcibly scissoring the tongue upwardly with respect to the tilt bar when the latter is coupled to the hauling vehicle, said locking member being pivotable after engagement with the tilt bar to thereby seat itself securely on the tilt bar.

4. In a boat trailer the combination comprising a frame having a pair of wheels, a tongue extending forwardly from the frame, a trailer tilting flat bar arranged so as to be normally parallel to said tongue, said flat bar having means at its forward end for anchoring to a hauling vehicle and having a pivot connection with said tongue at its rear end, means for clamping the flat bar in its parallel position relative to the tongue under conditions of transport while permitting disengagement so as to enable the tongue to scissor upwardly about the pivot connection for unloading of the boat, a jack mechanism anchored to the tongue and including a vertical support member together with means for lowering the support member into contact with the ground for supporting the tongue in the absence of the hauling vehicle, and a C-shaped locking member having a parallelogramic opening therein pivotally mounted at the lower end of the vertical support member for engaging the flat bar for forcibly scissoring the tongue upwardly with respect to the flat bar when the latter is coupled to the hauling vehicle, said locking member being successively pivotable to align said opening with the flat bar and seat the locking member securely on the bar.

5. In a boat trailer the combination comprising a frame having a pair of wheels, a tongue extending forwardly from the frame, a trailer tilt bar arranged so as to be normally parallel to said tongue, said tilt bar having means at its forward end for anchoring to a hauling vehicle and having a pivot connection with said tongue at its rear end, means for clamping the tilt bar in its parallel position relative to the tongue under conditions of transport while permitting disengagement so as to enable the tongue to scissor upwardly about the pivot connection for unloading of the boat, a jack mechanism anchored to the tongue and including a vertical support member together with means for lowering the support member into contact with the ground for supporting the tongue in the absence of the hauling vehicle, means including a member pivotally mounted at the lower end of the vertical support member for engaging the tilt bar for forcibly scissoring the tongue upwardly with respect to the tilt bar when the latter is coupled to the hauling vehicle, and bayonet type locking means associated with said pivotally mounted member for preventing dislodging of said tilt bar from the member during tilting of the trailer.

6. In a boat trailer having a frame with a pair of wheels, a tongue extending forwardly from the frame, a trailer tilting flat bar arranged so as to be normally parallel to the tongue, the flat bar having means at its forward end for anchoring to a hauling vehicle and having a pivot connection with the tongue at its rear end, and having means for clamping the flat bar in its parallel position relative to the tongue under conditions of transport while permitting disengagement so as to enable the tongue to scissor upwardly about the pivot connection for unloading of the boat, a jack mechanism anchored to the tongue and including a vertical support member together with means for lowering the support member into contact with the ground for supporting the tongue in the absence of the hauling vehicle, said mechanism including a C-shaped locking member having a parallelogramic opening therein pivotally mounted at the lower end of the vertical support member for engaging the flat bar for forcibly scissoring the tongue upwardly with respect to the flat bar when the latter is coupled to the hauling vehicle, and said locking member being successively pivotable to align said opening with the flat bar and seat the locking member securely on the bar.

7. In a boat trailer having a frame with a pair of wheels, a tongue extending forwardly from the frame, a trailer tilt bar arranged so as to be normally parallel to said tongue, the tilt bar having means at its forward end for anchoring to a hauling vehicle and having a pivot connection with the tongue at its rear end, and means for clamping the tilt bar in its parallel position relative to the tongue under conditions of transport while permitting disengagement so as to enable the tongue to scissor upwardly about the pivot connection for unloading of the boat, a jack mechanism anchored to the tongue and including a vertical support member together with means for lowering the support member into contact with the ground for supporting the tongue in the absence of the hauling vehicle, means including a member pivotally mounted at the lower end of the vertical support member for engaging the tilt bar for forcibly scissoring the tongue upwardly with respect to the tilt bar when the latter is coupled to the hauling vehicle, and bayonet type locking means associated with said pivotally mounted member for preventing dislodging of said tilt bar from the member during tilting of the trailer.

References Cited in the file of this patent

UNITED STATES PATENTS

| 1,941,400 | Johnson | Dec. 26, 1933 |
| 2,316,702 | McDaniel | Apr. 13, 1943 |
| 2,628,126 | Black | Feb. 10, 1953 |
| 2,711,259 | Jones | June 21, 1955 |
| 2,718,431 | Pietroroia | Sept. 20, 1955 |